Figure 1:
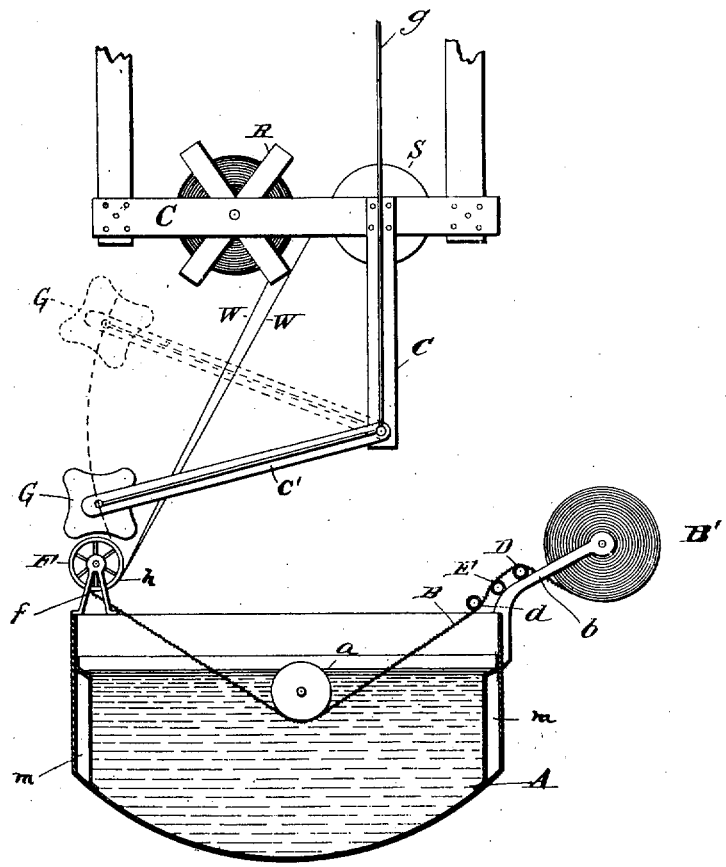

No. 850,124. PATENTED APR. 16, 1907.
E. F. BADGLEY, DEC'D.
H. HENRY, ADMINISTRATRIX.
MACHINE FOR MANUFACTURING COMPOSITION PIPE.
APPLICATION FILED JULY 12, 1893.

3 SHEETS—SHEET 1.

Witnesses:
Horace D. Ranlett
A. H. Ste. Marie

Inventor:
Eugene F. Badgley

No. 850,124. PATENTED APR. 16, 1907.
E. F. BADGLEY, DEC'D.
H. HENRY, ADMINISTRATRIX.
MACHINE FOR MANUFACTURING COMPOSITION PIPE.
APPLICATION FILED JULY 12, 1893.
3 SHEETS—SHEET 2.
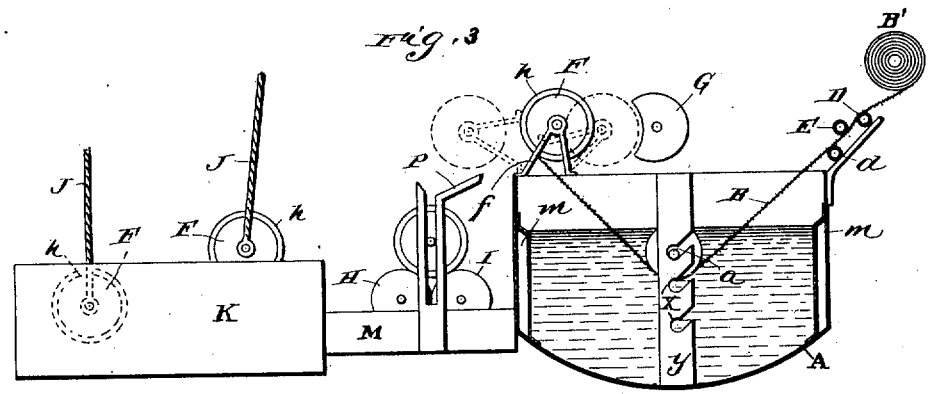
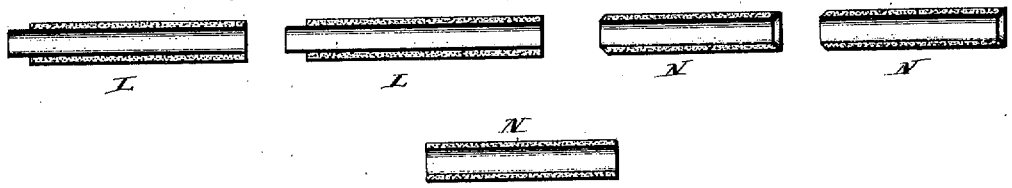
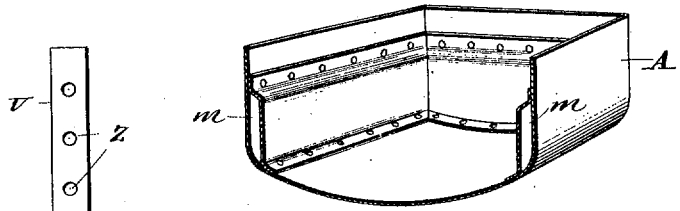
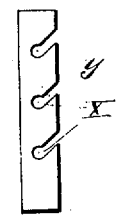
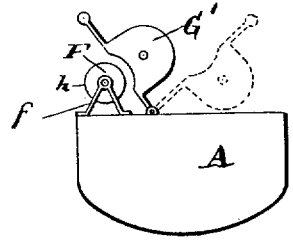
Witnesses:
Horace D. Rawlett
A. H. Ste Marie
Inventor:
Eugene F. Badgley No. 850,124. PATENTED APR. 16, 1907.
E. F. BADGLEY, DEC'D.
H. HENRY, ADMINISTRATRIX.
MACHINE FOR MANUFACTURING COMPOSITION PIPE.
APPLICATION FILED JULY 12, 1893.

3 SHEETS—SHEET 3.

Witnesses:
Horace D. Rawley
A. H. Ste Marie.

Inventor:
Eugene F. Badgley

UNITED STATES PATENT OFFICE.

EUGENE F. BADGLEY, OF SAN FRANCISCO, CALIFORNIA; HELEN HENRY ADMINISTRATRIX OF SAID EUGENE F. BADGLEY, DECEASED.

MACHINE FOR MANUFACTURING COMPOSITION PIPE.

No. 850,124.

Specification of Letters Patent.

Patented April 16, 1907.

Application filed July 12, 1893. Serial No. 480,321.

*To all whom it may concern:*

Be it known that I, EUGENE F. BADGLEY, a citizen of the United States, residing at San Francisco, in the county of San Francisco, in the State of California, have invented certain new and useful Improvements in Machines for Manufacturing Composition Pipe, of which the following is a specification.

This invention relates to the manufacture of, or to machines for manufacturing, composition pipe or tubing, and particularly that tubing for use in conducting gas, sewerage, drainage, and to carry and protect wires and cables for electric purposes; and some of the objects of the invention are to provide a machine or apparatus for manufacturing pipe or tubing embodying strength, durability, and lightness.

It is also an object of this invention to produce a machine or apparatus constructed to manufacture pipe or tubing rapidly and cheaply and to produce such an apparatus or machine which will be simple and cheap in construction and at the same time positive and effective in operation.

Another object of this invention is to provide a machine or apparatus constructed to use perforated paper, cloth, or wire-cloth and to wrap the same around a mandrel in layers, together with wire and sheet metal, after the material has been saturated or coated, or saturated and coated, with asphalt, maltha, bitumen or caoutchouc, and silicates or composite matter made in a mixture and carried to the mandrel with the aforesaid material, enough of said composition or mixture being retained between each layer to permeate the material, said machine or apparatus being further constructed to compress each layer of material as the same is being wound, so as to unite the layers together and prevent the peeling off or unwinding of the layers and to produce a strong, durable, and light pipe or tube impermeable to water and air.

With these and other objects in view the invention consists, essentially, in the construction, combination, and arrangement of parts substantially as more fully described in the following specification and essentially as illustrated in the accompanying drawings, forming part of this application, in which—

Figure 2:
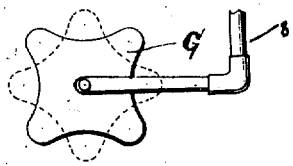
Figure 7:
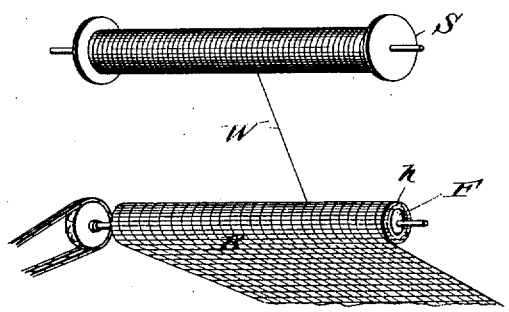
Figure 8:
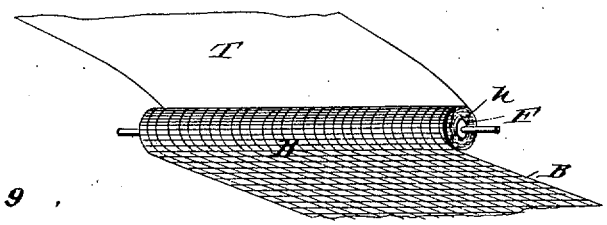
Figure 9:
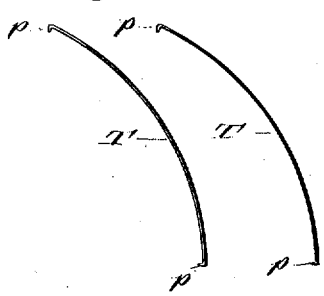
Figure 10:
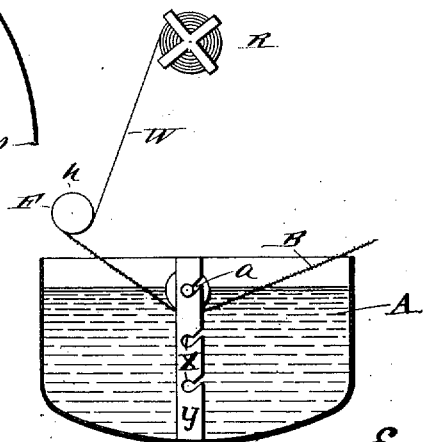

Figure 1 is a side elevational view, partly broken away and partly in section, illustrating the preferred form of machine or apparatus. Fig. 2 is a detail view of the ironer or pressure-roller. Fig. 3 is an elevational view, partly in section, illustrating the cooling devices. Fig. 4 is a detail view, partly in section, of a pipe or tube constructed with an internal sleeve or lining. Fig. 5 is perspective sectional view of the kettle or heating-receptacle. Fig. 5$^a$ and Fig. 5$^b$ are views in elevation of the roller-supports $v$ and $y$, respectively. Fig. 6 is a fragmental elevational view illustrating a modified form of the ironer or pressure-roll. Fig. 7 is a fragmental perspective view illustrating the wire-spool and the material or web in the process of being wound upon the mandrel. Fig. 8 is a view similar to Fig. 7, illustrating the metallic sheets and web or material in the process of being wound upon the mandrel. Fig. 9 is a detail view illustrating the sheets of metal having the edges thereof deflected laterally; and Fig. 10 is a fragmental view, partly in elevation and partly in section, of the kettle or heating-receptacle, the mandrel, and the reel for the wire, together with the web or material, showing the method of winding the wire and web or material upon the mandrel.

Similar characters of reference designate corresponding parts throughout the several views.

Referring to the drawings, and particularly to the construction illustrated in Figs. 1, 2, 3, 4, 5, and 10 thereof, the reference character A designates a kettle or heating-receptacle constructed to receive and retain a mixture or composition of maltha, bitumen, asphalt or caoutchouc, and silicates or composite matter made in a mixture of proportions and ingredients desired. Upon the interior of the kettle or receptacle A is formed or secured a continuous jacket $m$, or coils of steam-pipes may be employed instead of the jacket, if desired, for the purpose of heating the contents of the kettle or heating-receptacle, which it is desirable to keep at a temperature sufficient to liquefy the composition or mixture employed, as will be readily understood by those skilled in the art to which this invention appertains.

Formed on or connected with one end or side of the kettle or heating-receptacle A are brackets or supports *b*, constructed to removably receive and revolubly support the trunnions or axis of reel or drum B', containing material or web B, preferably consisting of a perforated paper, cloth, or wire-cloth. Revolubly mounted upon or adjacent to the bracket or support *b* are a plurality, preferably three, of heating and drying rollers or cylinders constructed to be supplied in any suitable manner with a heating and drying medium, desirably steam, for the purpose of removing the moisture from the material before the same reaches the contents of the kettle or heating-receptacle A, whereby the web or material will be in better condition to receive or become saturated with such contents, as will be readily understood.

Formed on or connected with the sides of the kettle or heating-receptacle are guides or supports V and Y, Fig. 3 and Figs. 5$^a$ and 5$^b$, one whereof is provided with a circular bearing Z and the other with bearings X, open at one side to permit the introduction and removal of the trunnions or axis of the submerged roller *a*, and by means of this construction the submerged roller can be adjusted with exactness, according to the height or level of the mixture or composition in the kettle or heating-receptacle A.

Mounted upon the top of the kettle or heating-receptacle A and opposite the brackets or supports *b* are brackets *f*, wherein is revolubly mounted a mandrel F, preferably consisting of a metallic cylinder open at both ends and braced by a spider or internal spokes, substantially as illustrated in Fig. 1 of the drawings, thereby affording lightness and ease of operation, and the mandrel may be driven by any well-known means, as a sprocket 1 and chain 2, as shown in Fig. 7, or by gearing.

By mounting the mandrel above the kettle or heating-receptacle A the composition or mixture dropping or being scraped from the material or web during the process or operation of forming the pipe or tubing will be received within the kettle or heating-receptacle, and thereby saved and reused, which is a very important feature of this invention, as will be readily appreciated by those versed in the manufacutre of such products.

Suitably mounted above the kettle or heating-receptacle A is a hanger-frame C, which may be supported in any manner, and revolubly and removably mounted in said frame is a reel or drum R, constructed to receive wire *w* either in predetermined lengths or of continuous length, adapted to be fed or unreeled to the mandrel F and wound thereon between and in connection with the layers of material or the web B, as hereinafter more fully explained.

Revolubly and removably mounted in the hanger-frame C is a spool or drum S, constructed to receive wire W, which is also adapted to be fed to the mandrel F and to be wound between and together with the web or material B.

Depending arms *c* are preferably connected with the hanger-frame C, and pivoted to the end of said arms are levers C', in the free end whereof is revolubly mounted an ironer or pressure device G, constructed with longitudinal concave faces or depressions approximately corresponding to the exterior contour of the mandrel F, Fig. 1, and by means of an actuating-rod *o* the ironer or pressure device can be raised or lowered, as shown in dotted lines, and the degree of pressure exerted can be regulated, as will be readily understood.

The ironer G is preferably provided with suitable connections 8, Fig. 2, with the source of supply of the heating medium, such as gas, and may be of several forms. For example, it may be a calender-roller having a different speed of rotation from that of the mandrel F, either faster or slower, or it may have a concave ironing-surface *g* or several such surfaces of different shapes. When constructed in the latter way, it does not rotate except to permit a particular surface to be brought into position, but is stationary while it irons. This latter form is regarded as preferable. The ironer may operate while the pipe is being wound on the mandrel; but it is sometimes better to keep it swung up into inactive position until after the pipe has been wound, when it is brought into play to finish forming the same, in doing which it returns to the kettle any excess material scraped off or squeezed out of the pipe.

Mounted adjacent to the kettle or heating-receptacle A is a water box or receptacle M, wherein are mounted wetting or cooling rollers H and I, of wood or metal, to cool, chill, and assist in tightening the material. Slotted guides P are mounted on each side of the water-box M and provided with guiding-arms to receive the trunnions or axis of the mandrel and direct the same into the slotted guides P, as shown in Fig. 3 of the drawings, said mandrels being discharged from their supports by the tilting or swinging of such supports. (See dotted lines in Fig. 3 of the drawings.)

Ropes J may be connected with the trunnions or axis of the mandrel and be supported in any suitable manner, (not shown,) whereby the mandrels are lifted out of contact with the cooling-rollers H and I and lowered into a tank K, containing a cooling bath or liquid, substantially as shown. If found desirable in practice, an internal sleeve or lining of aluminium L, Fig. 4, may be secured within the pipe or may be placed upon the mandrel F and the pipe wound thereon, and the sleeve L may extend beyond one end of the pipe to form a connection or joint in assembling the pipe.

The operation of this invention will be readily understood from the foregoing description when taken in connection with the accompanying drawings and the following description thereof.

The web or material B is unreeled and passed between the heating-rollers D, E, and $d$ and under the submerged roller $a$ and is drawn up to and around the mandrel F preferably by hand, and wire is drawn from the reel R and drum S, respectively, to the mandrel and passed therearound with the web or material B, whereupon the mandrel is rotated by hand or machinery, and the paper, cloth, or fabric is wound upon the mandrel at the same time or together with the wire or wires W, it being understood that the wire is wound spirally of the tube back and forth during the operation of the machine. This may be accomplished by any well-known mechanism or by hand.

During the winding of the web and material B and the wire upon the mandrel F the ironer or pressure device G is forced upon and rotates in contact with the same during the operation of winding and heats and smooths the coating or mixture or composition upon the web as the same is being wound, and all lumps or excess of mixture will be removed by the ironer and will fall into the kettle, thereby producing an even and finished surface for the product.

If found desirable in practice, sheets of metal T, with upturned edges $p$, Fig. 9, or a continuous sheet of metal, may be fed to and wound with the web or material B to afford additional rigidity to the pipe or tube, the upturned or deflected edges $p$ acting to retain the sheets of metal in position so they can be interlocked, as a seam of stovepipe.

In Fig. 6 of the drawings there is illustrated a modified construction of the ironer or pressure device, which is shown as mounted in a frame or hood G′, having a roller mounted therein to operate in connection with the mandrel F, as before stated.

Having described this invention, what is claimed is—

1. The combination of a receptacle for a hot adhesive mixture, supporting devices at the sides of said receptacle having a plurality of bearings, a roller vertically adjustable in said bearings, a reel adapted to carry a web of suitable material, a mandrel mounted on the receptacle, and steam-pipes adapted to press on each side of the web as it is drawn from the reel to be passed through the mixture under the roller and thence onto the mandrel, substantially as described.

2. The combination of a receptacle adapted to contain an adhesive mixture, a rotary mandrel mounted above said receptacle so as to take up a web of suitable material passed through the mixture and form it into a pipe or tube, and an ironer having a plurality of concave faces mounted above the receptacle and constructed to bear upon the mandrel and upon the material being wound thereon.

3. The combination of a receptacle for an adhesive mixture, a mandrel, means constructed to carry a web of foraminated material through the mixture and to wind the same on the mandrel and a spool carrying wire and located to feed the wire between the layers of the web as the same are wound on the mandrel.

4. The combination of a receptacle for an adhesive mixture, a rotary mandrel mounted thereover, means constructed to carry a web of suitable material through the mixture and wind the same upon the mandrel, and an adjustable, pivoted ironer having a concave face, located above the receptacle to coact with the material on the mandrel.

5. The combination of a receptacle for an adhesive mixture, a rotary mandrel, means for winding a web of suitable material upon the mandrel, said mandrel being movably mounted above said receptacle, and an ironer so disposed above the receptacle that the material on the mandrel may be brought into contact therewith by moving one of the two elements last named.

6. The combination of a receptacle for an adhesive mixture, a mandrel mounted above said receptacle, means for winding on said mandrel a web of suitable material passed through said mixture, a spool carrying wire to be wound on the mandrel at the same time and together with said web, and a pivoted ironer adapted to bear on the web and wire as the same are wound on the mandrel and embed the wire into the mixture on the web as the web and wire are being wound.

7. In apparatus for making pipe, the combination of a mandrel, and means for supplying to said mandrel a sheet having coating material thereon, for winding said web onto said mandrel, and for winding wire simultaneously with the convolutions of the pipe and between them.

8. In a machine for forming pipe of bituminous material, the combination with a mandrel, of means for winding material thereon, means for coating the material with bituminous material, and devices for feeding wire into the convolutions of the material as the same is wound upon the mandrel.

9. In a pipe-making apparatus, the combination of a power-driven mandrel; means for supplying to said mandrel a sheet having coating material thereon; means for pressing the coated sheet against the mandrel; and means for feeding wire into the convolutions of the sheet as the same is wound upon the mandrel.

10. The combination of a receptacle for a liquid, supports at the sides of said receptacle having a plurality of bearings, a roller vertically adjustable on said supports by the use of said bearings, a reel adapted to carry a web of suitable material, and a mandrel within the inside area of the receptacle and adapted to wind the web onto itself.

11. The combination of a receptacle for a liquid, a rotary mandrel over said receptacle and adapted to wind onto itself a web of suitable material passed through the liquid to form it into a pipe or tube, and a pivoted ironer having a concave face and mounted to bear on the material on said mandrel.

12. In a pipe-making apparatus, the combination of a liquid-receptacle, a mandrel, and means for drawing a web through said liquid, for winding said web onto said mandrel, and for winding wire simultaneously with the convolutions of the pipe and between them.

13. In a pipe-making apparatus, the combination of a power-driven mandrel; means supplying to said mandrel a sheet having coating material thereon; means capable of being heated for pressing the coated sheet against the mandrel; and means for feeding wire into the convolutions of the sheet as the same is wound on the mandrel.

14. The combination of a receptacle for a liquid, a rotary mandrel over said receptacle and adapted to wind onto itself a web of suitable material passed through the liquid to form it into a pipe or tube, a pivoted ironer having a concave face, and mounted to bear on the material on said mandrel, and means for heating said ironer.

15. The combination of a receptacle for a liquid, a rotary mandrel adapted to wind onto itself a web of suitable material passed through the liquid to form it into a pipe or tube, an ironer capable of bearing against the material on the mandrel, and means for heating said ironer.

16. The combination of a receptacle for a liquid, a rotary mandrel adapted to wind onto itself a web of suitable material passed through the liquid to form it into a pipe or tube, an ironer having a concave face and capable of bearing against the material on the mandrel, and means for heating said ironer.

17. The combination of a receptacle for a liquid, a rotary mandrel adapted to wind onto itself a web of suitable material passed through the liquid to form it into a pipe or tube, a pivoted ironer having a concave face and capable of bearing against the material on the mandrel, and means for heating said ironer.

18. The combination of a mandrel, means for coating material and for winding it on the mandrel, and a spool carrying wire and located to feed the wire between the layers of the material as the same is wound on the mandrel.

EUGENE F. BADGLEY.

Witnesses:
LEE D. CRAIG,
WALTER R. CRAIG.